United States Patent
Fite et al.

(10) Patent No.: US 7,936,847 B2
(45) Date of Patent: May 3, 2011

(54) REMOVAL OF MATCHED WAVEFORM INTERFERENCE

(75) Inventors: John D. Fite, Clifton, VA (US); James L. Rasmussen, Colorado Springs, CO (US)

(73) Assignee: The MITRE Corporation, McLean, VA (US)

( * ) Notice: Subject to any disclaimer, the term of this patent is extended or adjusted under 35 U.S.C. 154(b) by 939 days.

(21) Appl. No.: 11/783,600

(22) Filed: Apr. 10, 2007

(65) Prior Publication Data

US 2008/0159450 A1 Jul. 3, 2008

Related U.S. Application Data

(60) Provisional application No. 60/790,798, filed on Apr. 11, 2006.

(51) Int. Cl.
*H04L 27/06* (2006.01)
(52) U.S. Cl. .......................... 375/340; 375/316
(58) Field of Classification Search .................. 375/144, 375/148, 347, 349–350, 346, 316
See application file for complete search history.

(56) References Cited

U.S. PATENT DOCUMENTS

| | | | |
|---|---|---|---|
| 2004/0264557 A1* | 12/2004 | Maruyama | 375/148 |
| 2005/0130694 A1* | 6/2005 | Medvedev et al. | 455/522 |
| 2005/0152478 A1* | 7/2005 | Jalloul et al. | 375/340 |
| 2005/0190868 A1* | 9/2005 | Khandekar et al. | 375/346 |
| 2005/0195889 A1* | 9/2005 | Grant et al. | 375/148 |
| 2006/0098719 A1* | 5/2006 | Baltersee et al. | 375/148 |
| 2006/0221808 A1* | 10/2006 | Shirakata et al. | 370/203 |
| 2009/0296786 A1* | 12/2009 | Massicotte et al. | 375/148 |

* cited by examiner

*Primary Examiner* — Emmanuel Bayard
(74) *Attorney, Agent, or Firm* — Sterne Kessler Goldstein & Fox, P.L.L.C.

(57) ABSTRACT

Methods and systems of signal cancellation/separation for use in multi-signal communication environments are provided herein. Embodiments of the present invention use a feedback-optimized multi-signal multi-stage estimator with data-aided signal parameter estimation. Embodiments of the present invention require minimal information about the received signals and can be used to separate a desired signal from an interfering signal or two desired signals received on the same frequency. In the latter case, embodiments of the present invention effectively double the capacity of the communication system. Embodiments of the present invention are suitable for environments with intentional and/or unintentional jamming or interference. System embodiments of the present invention can be used as in-line solutions that can be inserted at different points in a receive chain.

23 Claims, 8 Drawing Sheets

REMOVAL OF MATCHED WAVEFORM INTERFERENCE

CROSS-REFERENCE TO RELATED APPLICATIONS

The present application claims the benefit of U.S. Provisional Patent Application No. 60/790,798 filed on Apr. 11, 2006, which is incorporated herein by reference.

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. 0705M880-W1 awarded by the United States Army.

BACKGROUND OF THE INVENTION

1. Field of the Invention

The present invention relates generally to communication systems, and more particularly to signal cancellation/separation architectures for use in multi-signal communication environments.

2. Background Art

A multitude of communication scenarios exist where multi-signal transmission/reception on a single frequency is needed. For example, it is desirable in duplex satellite communication systems that two or more terrestrial users use a single uplink frequency and a single downlink frequency to simultaneously communicate with a satellite transponder.

Conventional signal cancellation/separation techniques require substantial information about the signals being transmitted. For example, certain techniques require that a first signal in a composite signal is received and determined at the receiver before other signals are imposed on it. Other techniques require knowledge of several signal parameters, including amplitude, phase, frequency, spreading codes, and training sequences. Other research efforts focus on multi-path channel environments and exploit certain characteristics of these environments to remove interference from a composite signal.

Accordingly, conventional signal cancellation/separation techniques are limited to specific scenarios and are therefore not suitable to provide a general solution for this problem.

What are needed therefore are methods and systems of signal cancellation/separation that require minimal information about the transmitted signals in a composite signal and that operate in both multi-path and line-of-sight channel environments.

BRIEF SUMMARY OF THE INVENTION

Methods and systems of signal cancellation/separation for use in multi-signal communication environments are provided herein.

Embodiments of the present invention use a feedback-optimized multi-signal multi-stage estimator with data-aided signal parameter estimation. In an embodiment, data-aided methods are used to estimate the signal amplitude, phase, and frequency.

Embodiments of the present invention require minimal information about the received signals and can be used to separate a desired signal from an interfering signal or two desired signals received on the same frequency. In the latter case, embodiments of the present invention effectively double the capacity of the communication system.

Embodiments of the present invention support two modes of operation. In a first mode of operation, a first (interfering or desired) signal is initially present before a second (interfering or desired) signal is imposed on the same frequency. In a second mode of operation, both the first and second signals are initially present simultaneously as a composite signal. In this mode, an eigenvalue analysis of the composite signal constellation is used to generate initial phase estimates of the two signals.

Embodiments of the present invention are suitable for environments with intentional and/or unintentional jamming or interference.

System embodiments of the present invention can be used as in-line solutions that can be inserted at different points in a receive chain.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Introduction

Wireless signals are susceptible to various types of interference. One type of interference that is especially difficult to deal with is matched waveform interference. Matched waveform interference refers to a type of adjacent or co-channel interference in which an interfering signal occupies nearly the same frequency band and possesses nearly equal power as the signal intended for reception. Scenarios of matched waveform interference occur in various types of wireless networks, including cellular and satellite networks, for example.

Conventional signal cancellation/separation techniques require substantial information about the signals being transmitted and are often designed for specific types of channel environments such as multi-path channels, for example. As such, conventional signal cancellation/separation techniques do not provide a general solution for matched waveform interference.

Embodiments of the present invention provide methods and systems of signal cancellation/separation that require minimal information about the transmitted signals in a composite signal and that operate in both multi-path and line-of-sight channel environments.

Example Scenario of Multi-Signal Estimation

Figure 1:
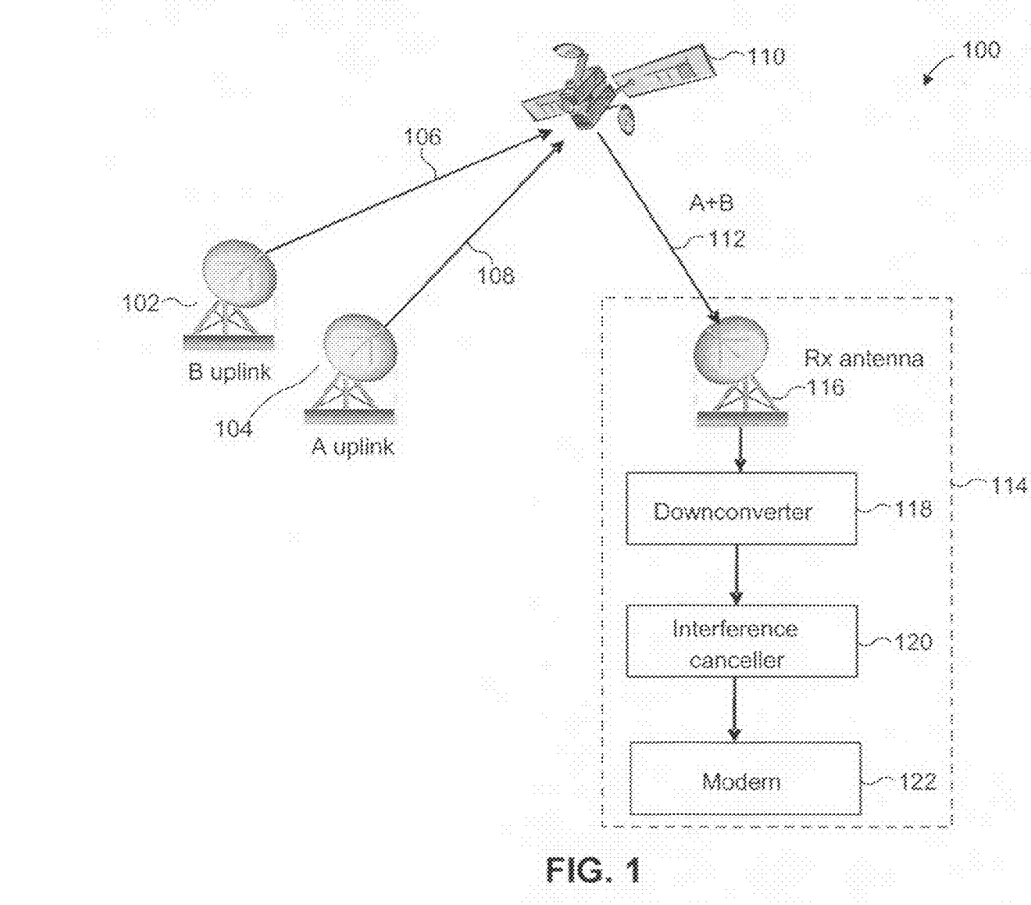
FIG. 1 is an example scenario using multi-signal estimation according to an embodiment of the present invention.

FIG. 1 is an example scenario 100 that illustrates multi-signal estimation according to an embodiment of the present invention. This example is provided for illustrative purposes only, and is not limiting. The invention is applicable to other wireless applications, as would be understood by a person skilled in the art. Example 100 illustrates a satellite communications scenario in which first and second terrestrial transmitters 102 and 104 simultaneously communicate over respective uplink channels with a satellite transponder 110. In an embodiment, signals 106 and 108 transmitted respectively by transmitters 102 and 104 are both desired signals at the receiver. Alternatively, one of transmitted signals 106 and 108 is a desired signal while the other is an interfering signal, which requires removal at the receiver.

Satellite transponder 110 receives transmitted signals 102 and 104 and forwards a composite signal 112 over downlink channel 112 to terrestrial receiver 114. Composite signal 112 includes a combination of transmitted signals 102 and 104.

Terrestrial receiver 114 includes a receive antenna 116, a down-converter 118, a multi-signal estimator 120, and a modem 122. Receive antenna 116 receives composite signal 112 and forwards it to down-converter 118. Down-converter 118 down-converts in frequency the received composite signal according to modem 122. For example, if modem 122 is configured to receive an intermediate frequency (IF) signal, down-converter 118 down-converts the received composite signal to an IF signal. Alternatively, if modem 122 is configured to receive a baseband (BB) signal, down-converter 118 down-converts the received composite signal to a BB signal.

Similarly, multi-signal estimator 120 is an in-line system configurable according to the application. In example scenario 100, multi-signal estimator 120 is configured to receive the output of down-converter 118 and to output estimates of transmitted signals 106 and 108 according to the expected input of modem 122. In another embodiment, multi-signal estimator 120 may be placed at a different position in the receive chain. For example, multi-signal estimator 120 can be placed between an Analog-to-Digital Converter (ADC) and a Digital-to-Analog Converter (DAC) of the receive chain. In an alternative application, multi-signal estimator 120 is used to separate transmitted signals 106 and 108 and to provide estimates of each, which are re-transmitted instead of being demodulated by modem 122.

In an embodiment, multi-signal estimator 120 implements a multi-stage estimation approach to separate and estimate transmitted signals 106 and 108. The multi-stage estimation approach can be feedback-optimized and/or enhanced with data-aided parameter estimation. Further embodiments of multi-stage estimator 120 are provided below.

Feedback-Optimized Multi-Signal Multi-Stage Estimation

Figure 2:
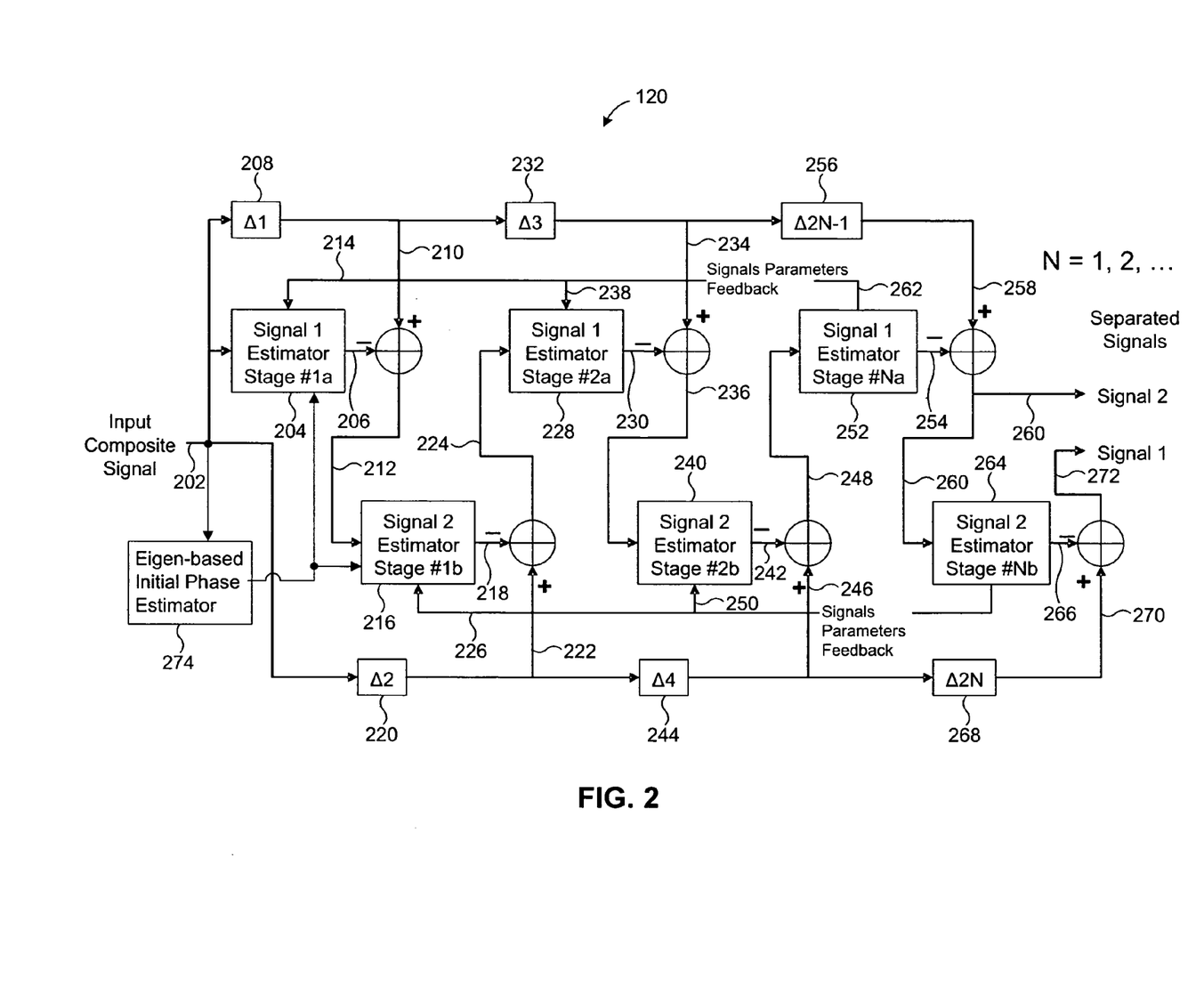
FIG. 2 is a block diagram of a multi-signal multi-stage estimator according to an embodiment of the present invention.

FIG. 2 is a block diagram of multi-signal multi-stage estimator 120 according to an embodiment of the present invention. Multi-signal multi-stage estimator 120 receives a composite input signal 202, which in the embodiment of FIG. 2 includes a combination of a first and a second received signals $S_1$ and $S_2$. Typically, composite input signal 202 is of the form $S_1+S_2+N$, where N is random noise.

Multi-signal multi-stage estimator 120 includes a plurality of estimation stages as illustrated in FIG. 2. For ease of illustration, only three estimation stages are depicted in FIG. 2. The invention, however, is not limited to this embodiment.

Composite input signal 202 is first input into a first estimator stage 204 configured to generate a first estimate 206 of the first signal $S_1$. In an embodiment, first estimator stage 204 receives a feedback signal 214 from one or more of the subsequent estimator stages that are similarly configured to generate estimates of the first signal $S_1$. For example, in the embodiment of FIG. 2, feedback signal 214 may include feedback information from one or more of estimator stages 228 and 252. Typically, feedback signal 214 contains feedback information related to one or more signal parameters, including phase, frequency, amplitude, and timing. As subsequent estimator stages will have better estimates of these signal parameters, feedback signal 214 allows first estimator stage 204 to generate a better estimate of the first signal $S_1$. This, in turn, allows multi-stage estimator 120 to converge faster to good estimates of signals $S_1$ and $S_2$. To improve the performance of first estimator stage 204, an optional eigen-based initial phase estimator 274 may be used to initialize the phase-tracking loop of first estimator stage 204.

Subsequently, first estimate 206 of the first signal $S_1$ is subtracted from a delayed version 210 of composite input signal 202. In FIG. 2, a delay element 208 is used to provide delayed signal 210. The resulting signal 212 is of the form $S_1+S_2-\hat{S}_{1,1}+N$, where $\hat{S}_{1,1}$ is first estimate 206 of the first signal $S_1$. Note that the better estimate 206 is of the first signal $S_1$ the closer resulting signal 212 is to the second signal $S_2$.

Signal 212 is input into a first estimator stage 216 configured to generate a first estimate 218 of the second signal $S_2$. Similar to first estimator stage 204, first estimator stage 216 receives a feedback signal 226 from one or more of the subsequent estimator stages that are similarly configured to generate estimates of the second signal $S_2$. For example, feedback signal 226 may include feedback information from one or more of estimator stages 240 and 264. Feedback signal 226 is used by first estimator stage 226 in generating first estimate 218 of the second signal $S_2$.

Subsequently, first estimate 218 of the second signal $S_2$ is subtracted from a delayed version 222 of composite input signal 202. In FIG. 2, a delay element 220 is used to provide delayed signal 222. The resulting signal 224 is of the form $S_1+S_2-\hat{S}_{2,1}+N$, where $\hat{S}_{2,1}$ is first estimate 206 of the second signal $S_2$. As such, signal 224 approaches the first signal $S_1$ as first estimate 218 better estimates the second signal $S_2$.

Signal 224 is then provided to a second estimator stage 228 that is configured to generate a second estimate 230 of the first signal $S_1$. Similar to first estimator stage 204, second estimator stage 228 also receives a feedback signal 238 from subsequent estimator stages that are similarly configured to generate estimates of the first signal $S_1$. Typically, second estimate 230 is a better estimate of the first signal $S_1$ than first estimate 206. This is because second estimator stage 228 operates on resulting signal 224, which contains fewer components of the second signal $S_2$ than composite input signal 202 does.

As in the first stage of estimation, second estimate 230 is subtracted from a delayed version 234 of composite input signal 202 to generate a resulting signal 236. Signal 236 is of the form $S_1+S_2-\hat{S}_{1,2}+N$, where $\hat{S}_{1,2}$ is second estimate 230 of the first signal $S_1$. Signal 236 is provided to a second estimator stage 240 of the second signal $S_2$, which generates a second estimate 242 of the second signal $S_2$.

Multi-stage estimation as described above continues for a number of stages according to the desired quality of the final estimates of the first and second signals $S_1$ and $S_2$. In the last estimation stage, final estimator stage 252 generates a last stage estimate 254 of the first signal $S_1$, which is subtracted from a delayed version 258 of composite input signal 202 to generate a final estimate 260 of the second signal $S_2$. Similarly, final estimator stage 264 generates a last stage estimate 266 of the second signal $S_2$, which is subtracted from a delayed version 270 of composite input signal 202 to generate a final estimate 272 of the first signal $S_1$.

According to embodiments of the present invention, estimation of signals $S_1$ and $S_2$ is performed at each estimation stage without any knowledge of the data framing structure, error codes, spreading codes, or CDMA codes, if any are used. Signals $S_1$ and $S_2$ can be Binary Phase Shift Keyed (BPSK) signals or, alternatively, M-ary Phase Shift Keyed (M-PSK) signals. Further, as would be understood by a person skilled in the art, embodiments of the present invention can be extended to support multi-signal estimation with more than two overlapping signals in the composite input signal.

Figure 4:
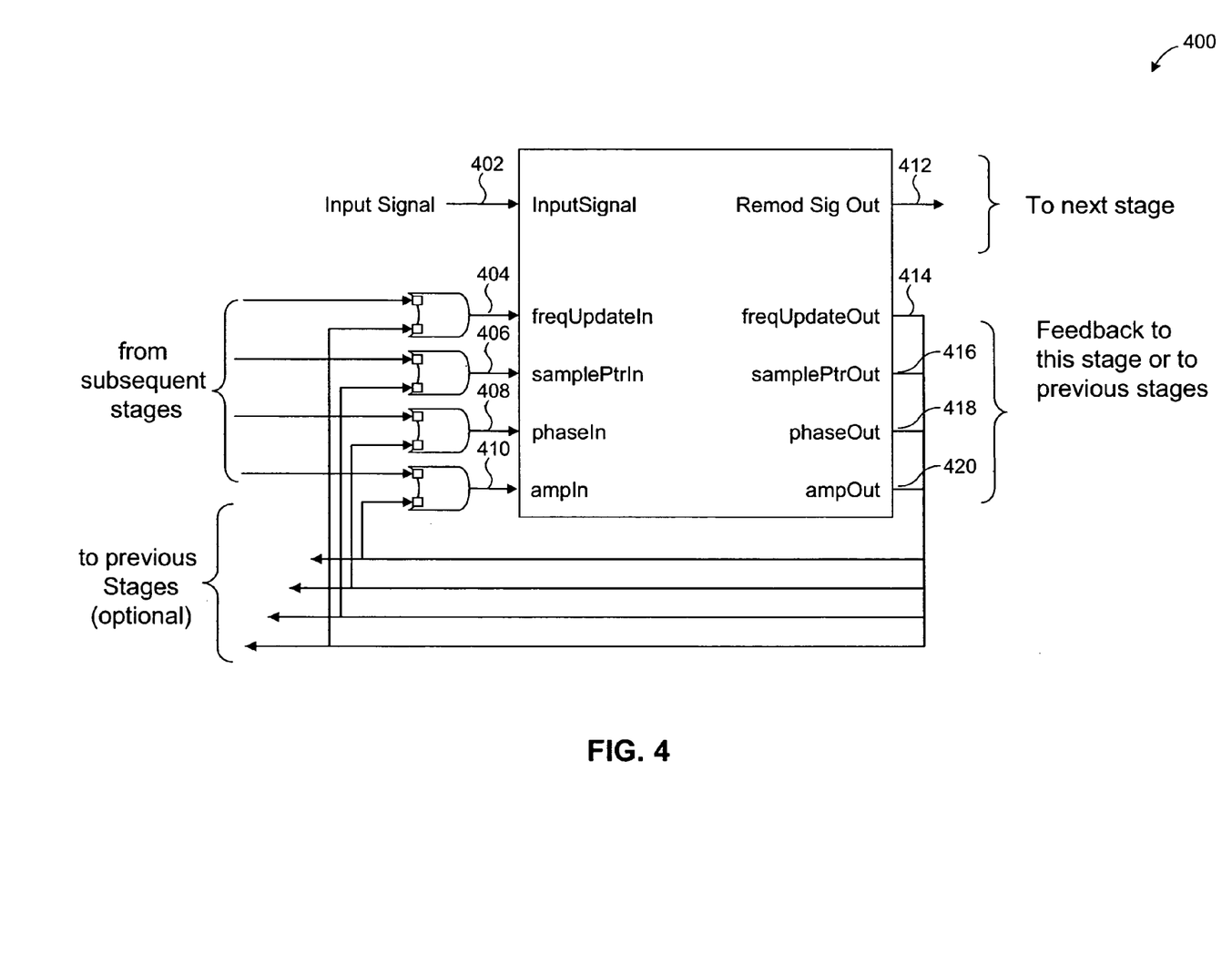
FIG. 4 is an example embodiment of a signal estimation stage in a multi-signal multi-stage estimator according to the present invention.

FIG. 4 is an example embodiment 400 of a signal estimation stage in a multi-signal multi-stage estimator according to the present invention. For example, embodiment 400 may be any of signal estimator stages 204, 216, 228, 240, 252, or 264 in FIG. 2.

Input signal 402 is received from a previous estimator stage or from a down-converter such as down-converter 118 in FIG. 1. As such, input signal 402 may be in the form of a composite input signal such as signal 202, for example, or of a composite input signal with an estimate of the interfering signal subtracted therefrom (e.g., signal 206).

Signal estimator 400 operates to generate an estimate of one desired signal out of a plurality of signals that may be contained in input signal 402. For example, referring to FIG. 2, signal estimator 204 generates an estimate of the first signal $S_1$ from received composite input signal 202, which contains an overlap of signals $S_1$ and $S_2$. Similarly, signal estimator 216 generates an estimate of the second signal $S_2$ from signal 212, which contains components of both signals $S_1$ and $S_2$.

In an embodiment, signal estimator 400 performs a demodulation on input signal 402 to generate bit estimates of the desired signal, before re-remodulating the generated bit estimates to generate the desired signal estimate. The demodulation process includes "parameter tracking" and bit estimation.

Parameter tracking includes tracking the input signal to generate estimates of signal parameters, including amplitude, phase, frequency, and symbol timing. Parameter tracking is crucial to the ability of the signal estimator to perform signal separation and/or cancellation. As described above, embodiments of the present invention operate without any initial knowledge of these signal parameters and may only have available knowledge of the used modulation scheme. In an embodiment, the estimates of signal parameters are averaged and refined over time.

As illustrated in FIG. 4, signal estimator 400 receives feedback signals 404, 406, 408, and 410 from its output stage and/or from subsequent estimation stages of the multi-stage estimator. In an embodiment, feedback signals 404, 406, 408, and 410 are respective combinations of output feedback signals 414, 416, 418, and 420 and feedback signals from subsequent stages. In embodiment 400, feedback signals 404, 406, 408, and 410 relate respectively to the frequency, symbol timing, phase, and amplitude of the input signal. Alternatively, additional or different feedback signals may be used. Signal estimator 400 refines its estimates of the signal parameters concurrently with signal demodulation and bit estimation. In an embodiment, signal estimation is performed on one block of sampled signal data at a time, with typical block sizes of 128 to 256 symbols although other block sizes can also be used.

Signal estimator 400 outputs an estimate 412 of the desired signal to the next estimation stage or as a final estimate of the desired signal.

Figure 5:
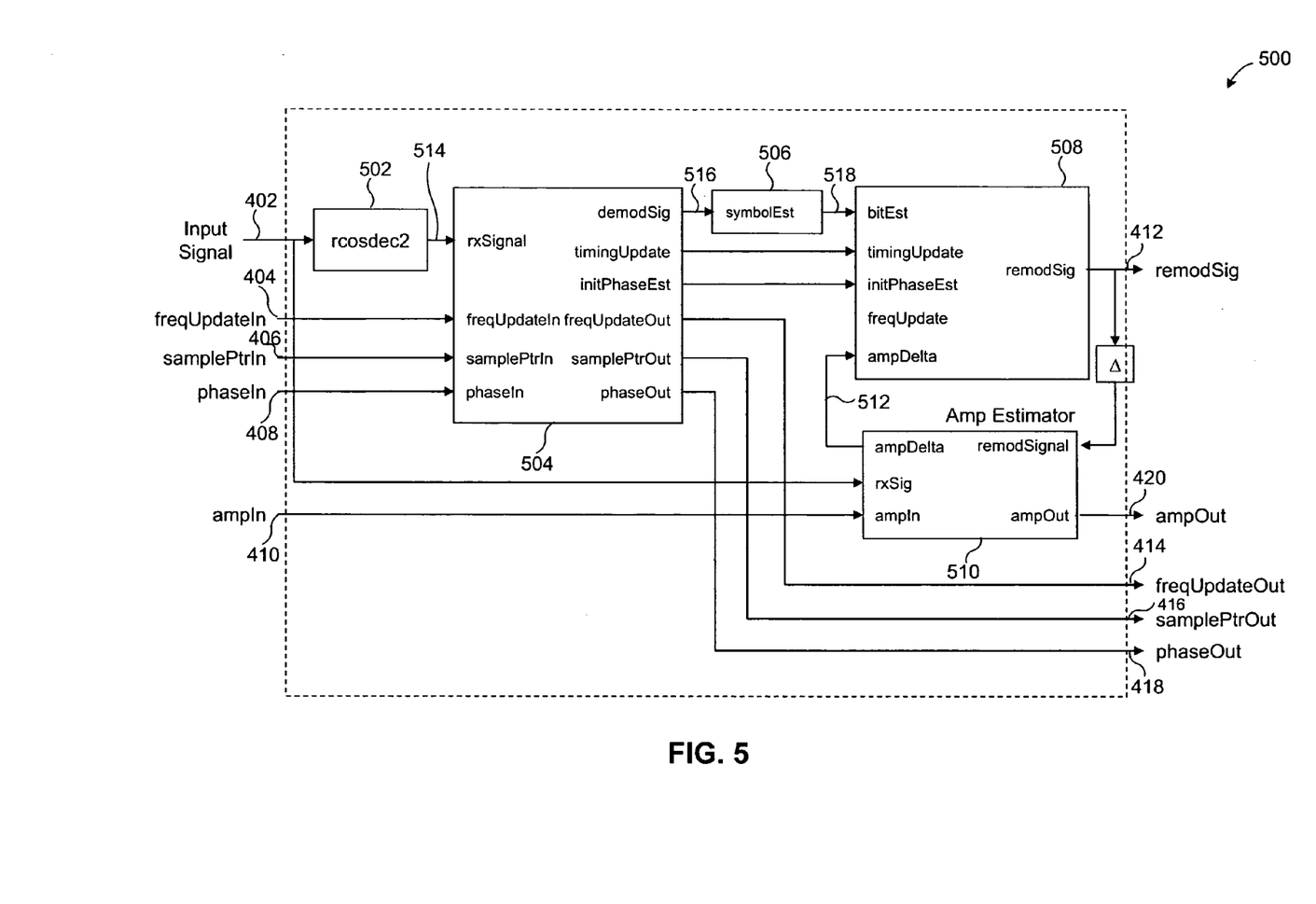
FIG. 5 is a block diagram of an example embodiment of a signal estimator according to the present invention.

FIG. 5 is a block diagram of an example embodiment 500 of signal estimator 400 of FIG. 4. Embodiment 500 includes a pulse shaping filter 502, a demodulator 504, a bit estimator 506, a re-modulator 508, and an amplitude estimator 508.

Embodiment 500 receives input signal 402, which is first acted on by a pulse shaping filter 502 to generate a pulse shaped signal 514. Pulse shaping filter 502 is typically a root-raised cosine filter having good ISI (Inter-Symbol Interference) elimination capabilities.

Pulse shaped signal 514 is input into demodulator 504, which demodulates signal 514 to generate a demodulated signal 516. As described above, demodulator 504 also receives feedback signals 404, 406, and 408 from subsequent estimation stages and/or the current estimation stage. Feedback signals 404, 406, and 408 contain estimates of input signal parameters, including frequency, symbol timing, and phase, which allow demodulator 504 to better track and more accurately demodulate the desired signal. In an embodiment, demodulation is performed using data-directed parameter locking.

Demodulator 504 outputs demodulated signal 516 to bit estimator 506. Further, demodulator 504 outputs symbol timing and phase information to re-modulator 508 and feedback signals 414, 416, and 418 to be provided to preceding estimation stages of the multi-stage estimator. Note that feedback signals 414, 416, and 418 that are output by demodulator 504 may be updated compared to input feedback signals 404, 406, and 408.

Bit estimator 506 receives demodulated signal 516 and generates bit estimates 518 of the desired signal, which are subsequently provided to re-modulator 508. In an embodiment, error correction is employed in bit estimator 506 to improve the accuracy of bit estimates 518. Re-modulator 508 modulates bit estimates 518 to generate re-modulated signal 412, which is provided to the next estimation stage. In an embodiment, re-modulator 508 employs data-directed amplitude estimation. In FIG. 5, for example, re-modulator 508 employs a feedback scheme using an amplitude estimator 510 to adjust the amplitude of modulated signal 412. Amplitude estimator 510 cross-correlates a delayed version of re-modulated signal 412 with input signal 402 to estimate an amplitude increment/decrement 512 to be applied by re-modulator 508.

Figure 6:
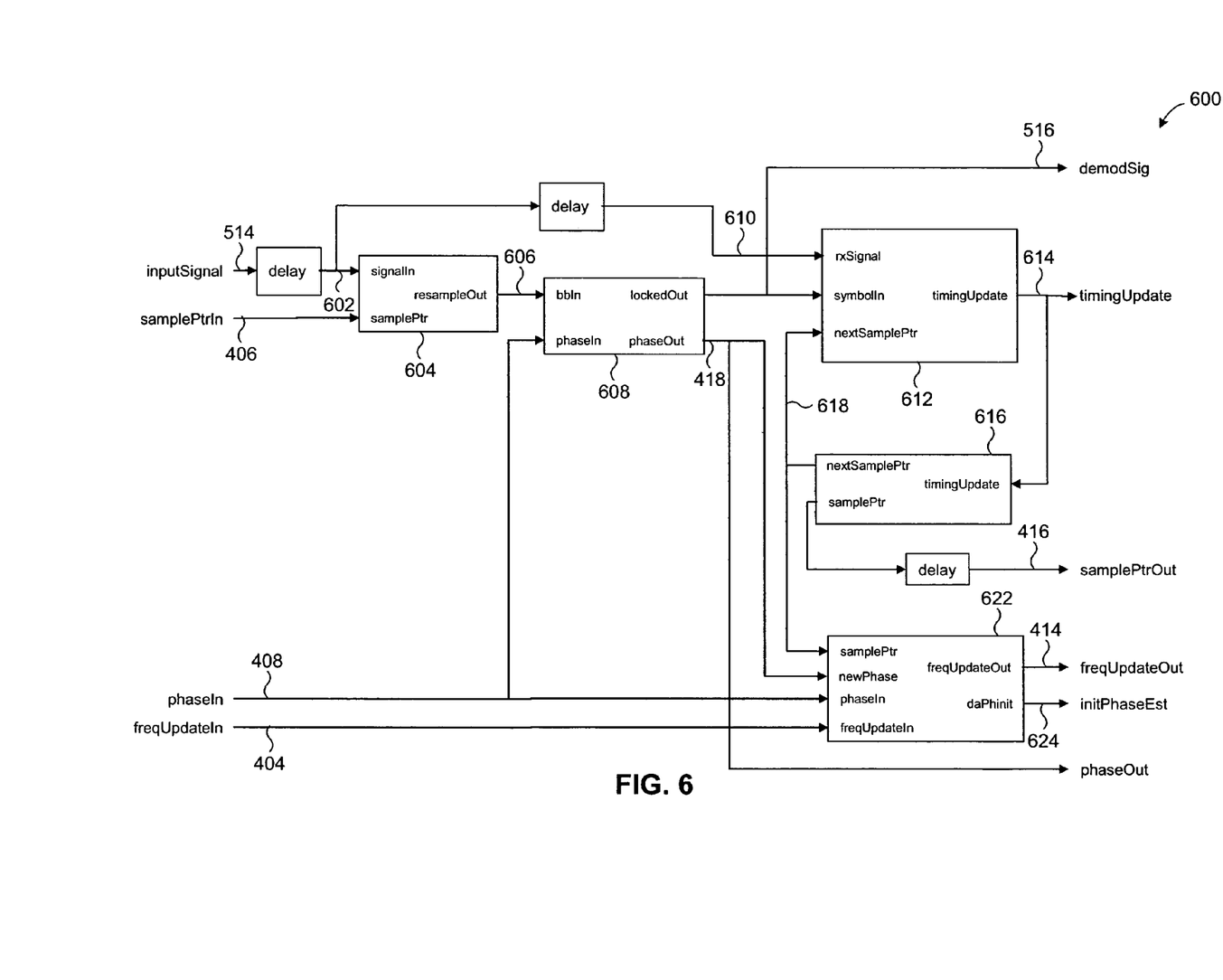
FIG. 6 is a block diagram of an example embodiment of a demodulator according to the present invention.

FIG. 6 is a block diagram of an example embodiment 600 of a demodulator according to the present invention. Example demodulator 600 may be an embodiment of demodulator 504 of signal estimator embodiment 500.

Demodulator 600 includes a re-sampler module 604, a phase tracking module 608, a symbol timing module 612, and a frequency estimation module 622.

Re-sampler 604 receives a delayed version 602 of pulse shaped signal 514 and a timing feedback signal 406 from a subsequent estimation stage. Re-sampler 604 re-samples signal 602 to ensure that sampling occurs in the middle of the sample interval. Re-sampler 604 then outputs re-sampled signal 606 to phase tracking module 608.

Phase tracking module 608 receives re-sampled signal 606 and a phase feedback signal 408 and generates an updated phase signal 418 and demodulated signal 516. Note that when demodulator 600 is part of a first stage estimator, phase tracking is non-data aided for the first block of the input signal. Demodulated signal 516 contains estimates of symbols contained in received signal 514 and, in addition to being provided to a subsequent bit estimation module (not shown in FIG. 6), is input into symbol timing module 612.

Symbol timing module 612 receives a delayed version 610 of input signal 514, demodulated signal 516, and a feedback sample timing indicator 618 to generate a timing update signal 614 for the re-modulator stage of the signal estimator. Timing update signal 614 is also used by a timing indicator generation module 616 to generate feedback sample timing indicator 618 for the next block of data received by timing module 612. In addition, timing indicator generation module 616 employs timing update signal 614 to generate symbol timing feedback signal 416, which is provided to preceding estimation stages.

Frequency estimation module 622 compares phase and frequency feedback signals 408 and 404 with updated data-free phase signal 418 to generate updated frequency feedback signal 414, which is provided to preceding estimation stages. Further, frequency estimation module 622 generates a phase initialization signal 624 that is provided to the re-modulator stage of the signal estimator.

Figure 7:
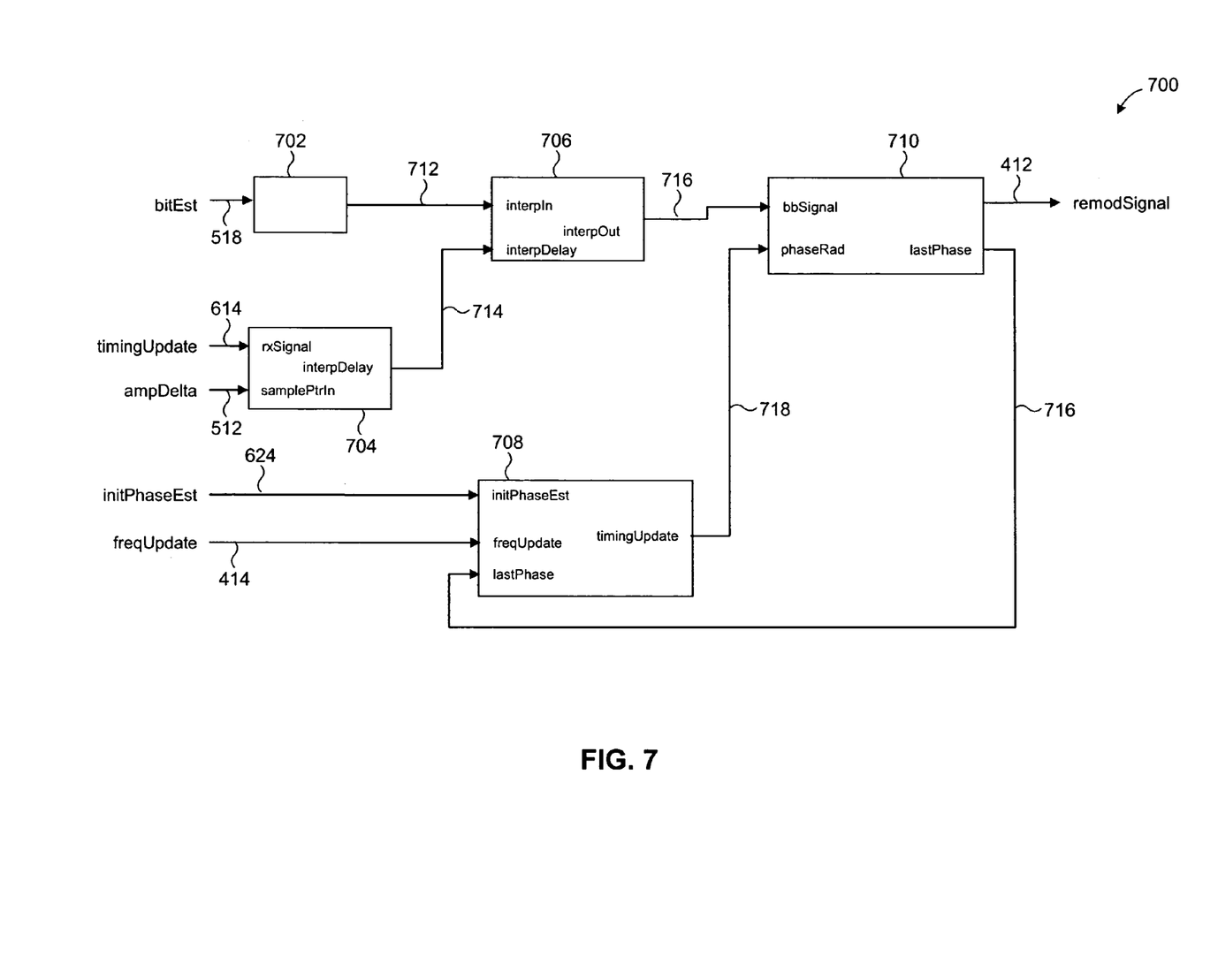
FIG. 7 is a block diagram of an example embodiment of a re-modulator according to the present invention.

FIG. 7 is a block diagram of an example embodiment 700 of a re-modulator according to the present invention. Example re-modulator 700 may be an embodiment of re-modulator 508 of signal estimator embodiment 500.

Re-modulator 700 includes a pulse shaping filter 702, an interpolation delay generation module 704, a variable interpolator 706, a timing module 708, and a mixer 710.

Pulse shaping filter 702 receives bit estimates 518 from a preceding bit estimation module of the signal estimator and outputs a pulse shaped signal 712 to variable interpolator 706.

Interpolation delay generation module 704 receives feedback timing and amplitude signals 614 and 512 and generates an interpolation delay 714, which is also provided to variable interpolator 706.

Variable interpolator 706 uses interpolation delay 714 to interpolate signal 712 and to generate an interpolated signal 716 that is aligned with the original input signal.

Timing module 708 receives an initial phase estimate signal 624, a frequency feedback signal 414, and a last phase feedback signal 716 and outputs a timing signal 718 to mixer 710. Initial phase estimate signal 624 is provided by a preceding demodulator stage in the signal estimator. Last phase feedback signal 716 is received from mixer 710 and includes the last phase used by mixer 710 to generate re-modulated signal 412.

Mixer 710 modulates interpolated signal 716 using timing signal 718 to generate re-modulated signal 412.

Figure 3:
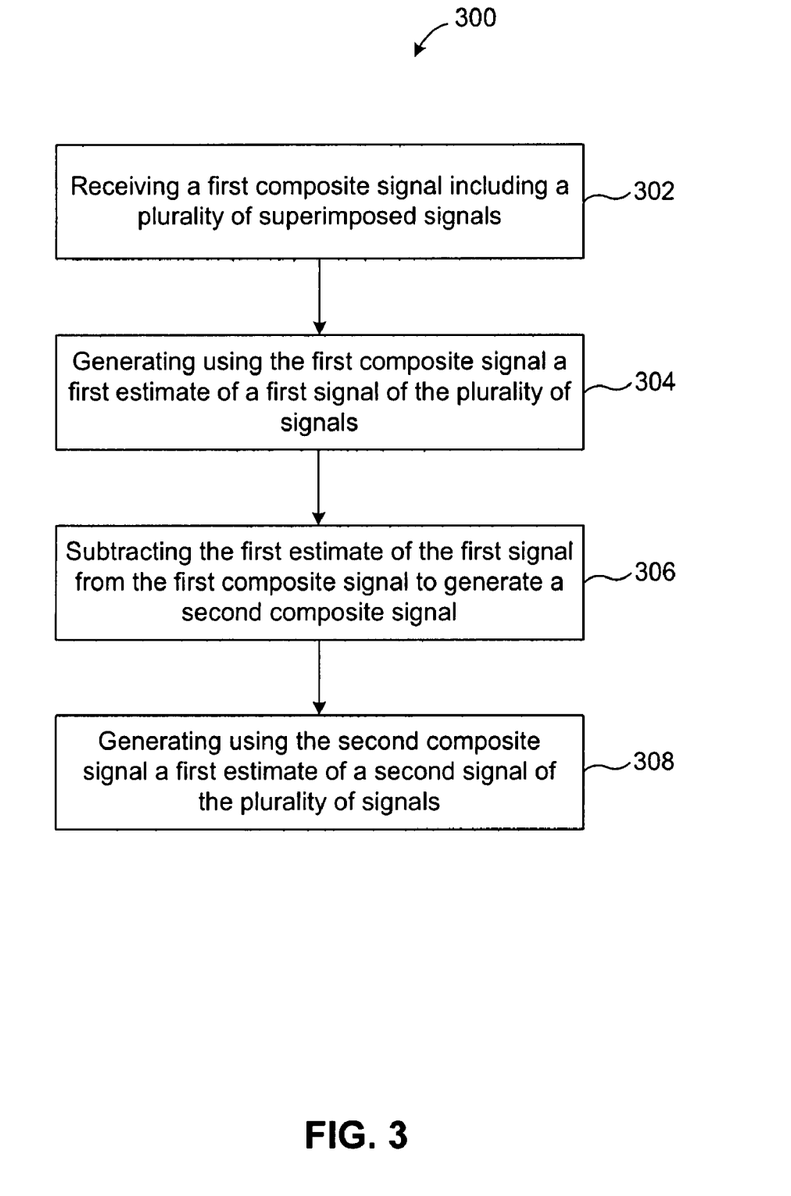
FIG. 3 is a process flowchart of a method of multi-signal multi-stage estimation according to an embodiment of the present invention.

FIG. 3 is a process flowchart 300 of a method of multi-signal multi-stage estimation according to an embodiment of the present invention. Process flowchart 300 begins in step 302, which includes receiving a first composite signal including a plurality of superimposed signals. In an embodiment, the first composite signal is a satellite transmitted signal. Alternatively, the first composite signal is a wireless cellular signal. The invention is not limited to these embodiments and is applicable to any wireless application, as would be understood by a person skilled in the art.

Step 304 includes generating using the first composite signal a first estimate of a first signal of the plurality of superimposed signals. In an embodiment, the first signal is a desired signal by the receiver. Alternatively, the first signal is an interfering signal that needs to be removed. In an embodiment, estimate generation includes de-modulating the first composite signal based on estimated signal parameters to generate a demodulated signal. The estimated signal parameters are generated using feedback signal information received from subsequent estimation stages of the multi-stage estimation process and/or data-aided parameter estimation techniques. In an embodiment, data-aided parameter estimation techniques are used to estimate one or more of signal amplitude, phase, frequency, and symbol timing. Estimate generation subsequently includes generating bit estimates based on the demodulated signal and re-modulating the bit estimates to generate a re-modulated signal. The re-modulated signal represents the first estimate of the first signal of the plurality of superimposed signals. In an embodiment, error correction is used to improve the quality of the generated bit estimates. Typically, this is used at later stages of the multi-stage estimation process as the signal estimates become more accurate.

Referring back to process flowchart 300, step 306 includes subtracting the first estimate of the first signal from the first composite signal to generate a second composite signal.

Step 308 includes generating using the second composite signal a first estimate of a second signal of the plurality of superimposed signals. Estimate generation is performed using similar steps as described above in step 304.

As described above, to improve the performance of the first estimator stage, an optional eigen-based phase estimator may be used to initialize the phase tracking loop of the first estimator stage. This is particularly useful when the superimposed signals are all present at the time that the multi-signal estimator is activated, in order to prevent false phase locks.

Figure 8:
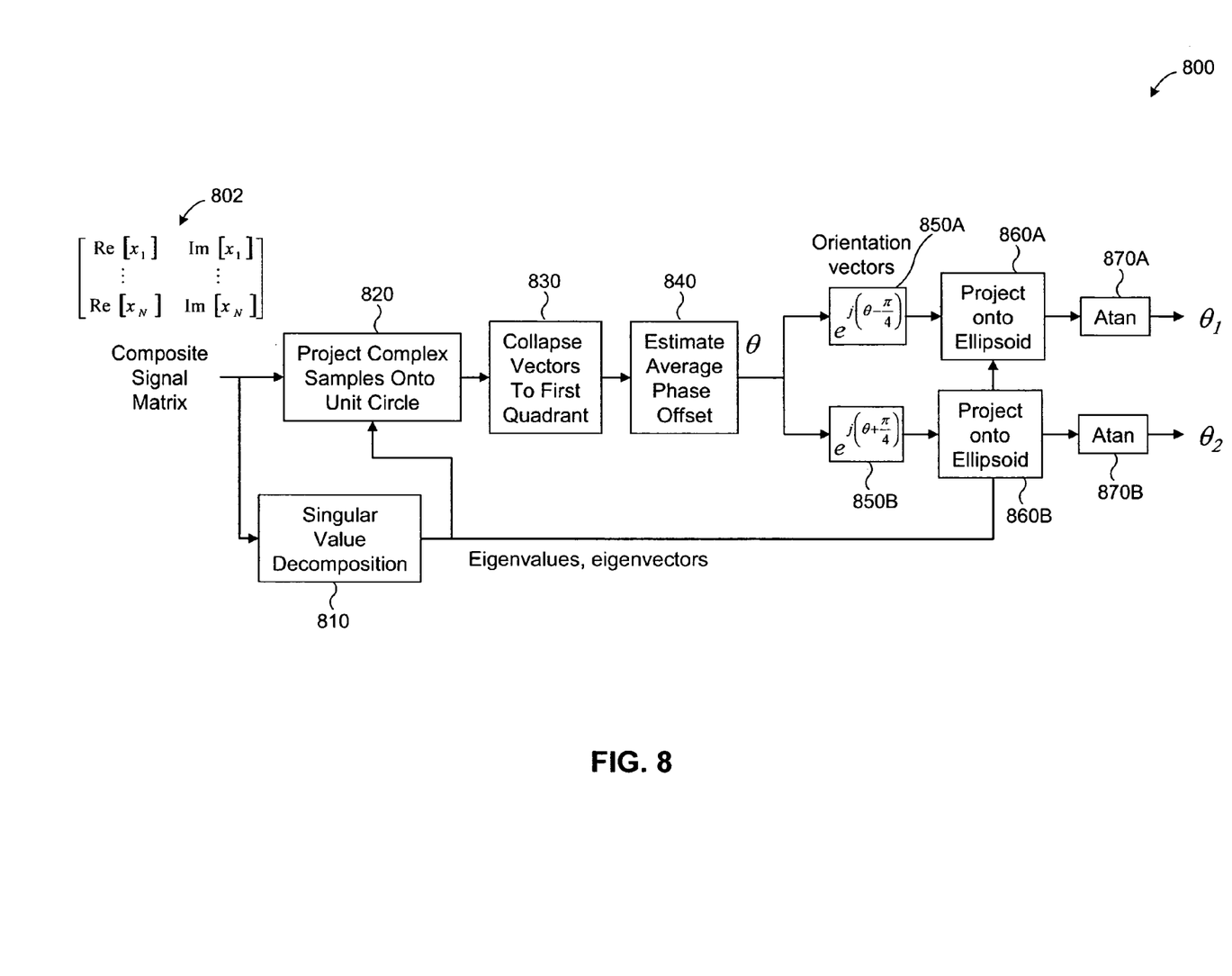
FIG. 8 is a block diagram of an example process for eigen-based phase estimation according to the present invention.

FIG. 8 is a block diagram of an example process 800 for eigen-based phase estimation according to an embodiment of the present invention. Process 800 describes eigen-based phase estimation in the case of a composite signal with two overlapped BPSK signals. Embodiments of the present invention are not limited to this example process. As would be appreciated by a person skilled in the art based on the teachings herein, example process 800 can be extended to composite signals with more than two overlapped signals and/or non-BPSK signals, including, for example, QPSK and M-PSK.

Process 800 begins by generating a N×2 composite signal matrix 802 of complex samples of the composite signal. Since, in the case of BPSK, the composite signal constellation lies in an ellipsoid, the signal constellation should first be translated onto a unit circle to estimate its phase offset.

Accordingly, in step 810, singular value decomposition (SVD) is performed on matrix 802 to generate the eigenvalues and the eigenvectors of matrix 802. Using the generated eigenvalues and eigenvectors, in step 820, the complex samples of the composite signal matrix are projected as vectors onto a unit circle.

In step 830, the projected vectors are collapsed to the first quadrant of the unit circle, and, in step 840, an average phase offset estimate θ of the signal constellation is calculated. In an embodiment, step 830 includes performing a module 90° operation on the angles associated with the projected vectors. In an embodiment, step 840 includes calculating an average of the phase angles associated with the projected vectors after collapsing them to the first quadrant.

In steps 850A and 850B, two orientation vectors are generated using the average phase offset estimate θ. The orientation vectors represent the orientation of the 2 BPSK signals. In an embodiment, the orientation vectors are symmetrically shifted around the average phase offset estimate θ.

In steps 860A and 860B, the orientation vectors generated in steps 850A and 850B in a unit circle are projected onto an ellipsoid using the eigenvalues and eigenvectors generated in step 810. Subsequently, in steps 870A and 870B, the phase offsets of the projected vectors are calculated and used as initial phase estimates for the two overlapped BPSK signals.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for separating a plurality of signals in a composite signal, comprising:
    an estimator configured to receive the composite signal and to generate successive estimates of each signal of said plurality of signals in the composite signal;
    wherein said estimator includes a plurality of estimation stages,
    wherein each of said estimation stages includes a signal tracking module,
    wherein said signal tracking module is configured to receive signal tracking feedback information from subsequent estimation stages and to perform data-aided estimation of signal parameters of an input signal to said estimation stage using said signal tracking feedback information, and wherein said signal tracking feedback information includes estimates of at least one of amplitude, phase, frequency, and symbol timing of said input signal.

2. The system of claim 1, wherein each of said estimation stages is configured to estimate one signal of said plurality of signals and further comprises:
    a de-modulator configured to receive a signal having components of one or more of said plurality of signals and to generate a demodulated signal of said one signal;
    a bit estimator configured to generate bit estimates based on said demodulated signal; and
    a re-modulator configured to receive said bit estimates and to generate a re-modulated signal.

3. The system of claim 2, wherein said de-modulator is configured to receive said estimated signal parameters from said signal tracking module.

4. The system of claim 2, wherein one or more of said estimation stages further comprise:
    an error correction module configured to improve said bit estimates.

5. The system of claim 1, wherein said signal tracking feedback information includes phase error signals from a final set of estimation stages.

6. The system of claim 1, wherein said data-aided estimation of signal parameters includes estimation of one or more of amplitude, phase, frequency, and symbol timing.

7. The system of claim 1, wherein said signal tracking module includes an eigenvalue analysis module configured to generate initial signal phase estimates based on a signal constellation of said composite signal.

8. The system of claim 1, wherein a first of said estimation stages receives the composite signal and generates an estimate of a first signal in said composite signal.

9. The system of claim 8, wherein a second of said estimation stages receives a difference signal between said composite signal and said first signal estimate and generates an estimate of a second signal in said composite signal.

10. The system of claim 9, wherein a final set of said estimation stages generates a final estimate for each of said plurality of signals in said composite signal.

11. The system of claim 1, wherein said plurality of signals have substantially similar bandwidth, data rate, and/or amplitude.

12. The system of claim 1, wherein said estimator has initial knowledge of only the modulation type of said plurality of signals.

13. The system of claim 1, wherein said plurality of signals are Binary Phase Shift Keyed (BPSK) signals.

14. The system of claim 1, wherein said plurality of signals are M-ary Phase Shift Keyed (M-PSK) signals.

15. The system of claim 1, wherein the system is configured to be operable at different stages in a receive chain of a multi-signal receiver.

16. The system of claim 1, wherein the composite signal is a satellite transmitted signal.

17. A method for separating a plurality of signals in a composite signal, comprising:
    receiving by an estimator module a first composite signal including a plurality of signals;
    generating using said first composite signal a first estimate of a first signal of said plurality of signals;
    subtracting said first estimate of said first signal from said first composite signal to generate a second composite signal;
    generating using said second composite signal a first estimate of a second signal of said plurality of signals;
    subtracting said first estimate of said second signal from said first composite signal to generate a third composite signal; and
    generating using said third composite signal a second estimate of said first signal;
    wherein each of said generating steps comprises:
    receiving feedback signal tracking information from subsequent estimation stages; and
    performing data-aided signal parameter estimation using said feedback signal tracking information to generate estimated signal parameters.

18. The method of claim 17, wherein each of said generating steps further comprises:
    de-modulating said first and second composite signals based on said estimated signal parameters to generate a demodulated signal;
    generating bit estimates based on said demodulated signal; and
    re-modulating said bit estimates to generate a re-modulated signal.

19. The method of claim 18, wherein each of said generating steps comprises:
    performing error-correction to improve said bit estimates.

20. The method of claim 17, wherein said step of receiving feedback signal tracking information comprises receiving phase error signals for a final set of estimation stages.

21. The method of claim 17, wherein said step of performing data-aided signal parameter estimation includes performing data-aided estimation of one or more of amplitude, phase, frequency, and symbol timing.

22. The method of claim 17, wherein said plurality of signals are Binary Phase Shift Keyed (BPSK) signals.

23. The method of claim 17, wherein said plurality of signals are M-ary Phase Shift Keyed (M-PSK) signals.

* * * * *